United States Patent [19]

Orza et al.

[11] Patent Number: 4,981,010
[45] Date of Patent: Jan. 1, 1991

[54] HORSE BOOT

[76] Inventors: Frank Orza; Mary Hughes, both of 5 Pawling Rd., Rte. 301, Cold Spring, N.Y. 10516

[21] Appl. No.: 401,627

[22] Filed: Aug. 31, 1989

[51] Int. Cl.$^5$ .............................................. A01L 3/00
[52] U.S. Cl. ........................................... 54/82; 168/18
[58] Field of Search ........................ 168/1, 2, 18, 22; 54/82; 36/111; 12/142 E, 142 EV

[56] References Cited

U.S. PATENT DOCUMENTS

| | | | |
|---|---|---|---|
| 22,955 | 12/1893 | Ray . | |
| D. 26,832 | 3/1897 | Hirsch | 54/82 X |
| 35,484 | 12/1901 | Bolton . | |
| 473,295 | 4/1892 | Coates . | |
| 519,047 | 5/1894 | Rogers . | |
| 759,636 | 5/1904 | Ryan | 168/18 X |
| 840,892 | 1/1907 | Adam . | |
| 1,039,002 | 9/1912 | Winston . | |
| 1,043,978 | 11/1912 | St. John . | |
| 1,218,901 | 3/1917 | Saxton | 168/18 |
| 2,041,538 | 5/1936 | Gash et al. | 168/18 |
| 3,703,209 | 11/1972 | Glass | 168/2 |
| 3,732,929 | 5/1973 | Glass | 168/18 |
| 4,174,754 | 11/1979 | Glass | 168/18 |
| 4,212,356 | 7/1980 | Battle | 168/18 |
| 4,444,269 | 10/1981 | Laurent | 168/1 |
| 4,470,466 | 9/1984 | Nakanishi | 168/1 |
| 4,503,914 | 3/1985 | Voland | 168/18 |
| 4,548,026 | 10/1985 | Shidner | 54/82 |
| 4,736,800 | 4/1988 | Rohner | 168/18 |

FOREIGN PATENT DOCUMENTS

| | | | |
|---|---|---|---|
| 2560745 | 9/1985 | France | 54/82 |
| 188225 | 11/1922 | United Kingdom | 168/18 |

Primary Examiner—Robert P. Swiatek
Attorney, Agent, or Firm—Shlesinger & Myers

[57] ABSTRACT

A horse boot, for enclosing a horse hoof to at least above its coronet band, comprises a flexible enclosure molded and adapted to fit around a horse hoof. The enclosure has inner and outer surfaces, an upper opening, a bottom portion and a wrap-around wall portion integral with the bottom portion. The bottom portion includes upper and lower surfaces and the upper surface includes a marginal portion. The wrap-around wall portion includes an upper rim, inner and outer surfaces and a vertical slit. The slit intersects the upper opening and terminates substantially adjacent the bottom portion, thereby permitting the upper opening to be enlarged for putting on or removing the boot from the horse hoof. A belt and buckle assembly is operably associated with the wrap-around wall portion for securing the boot around the horse roof. The enclosure includes a layer of absorent cloth material bonded to the inside surface thereof. The absorbent cloth material includes a lower edge folded inwardly and bonded to the upper marginal portion of the upper surface of the bottom portion.

36 Claims, 3 Drawing Sheets

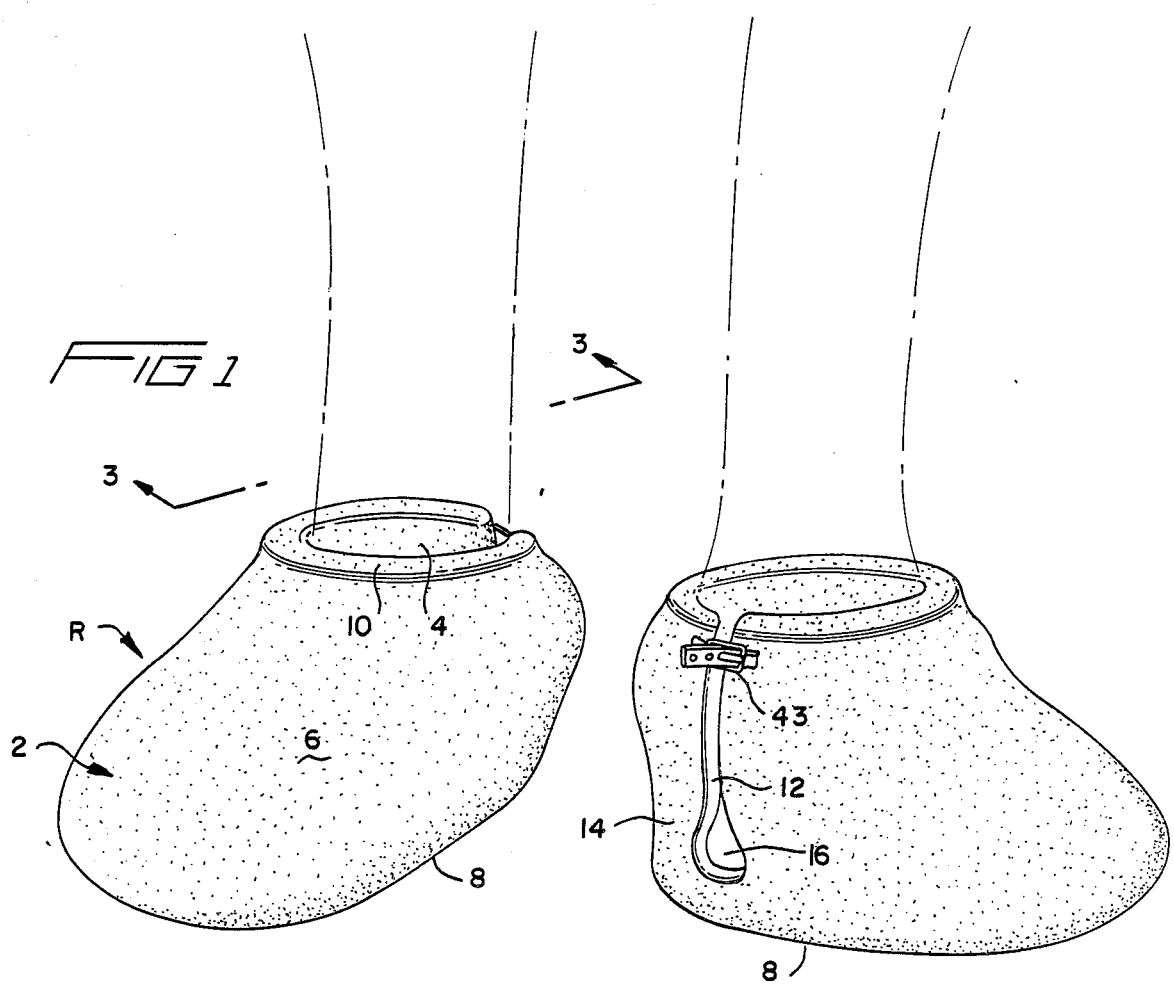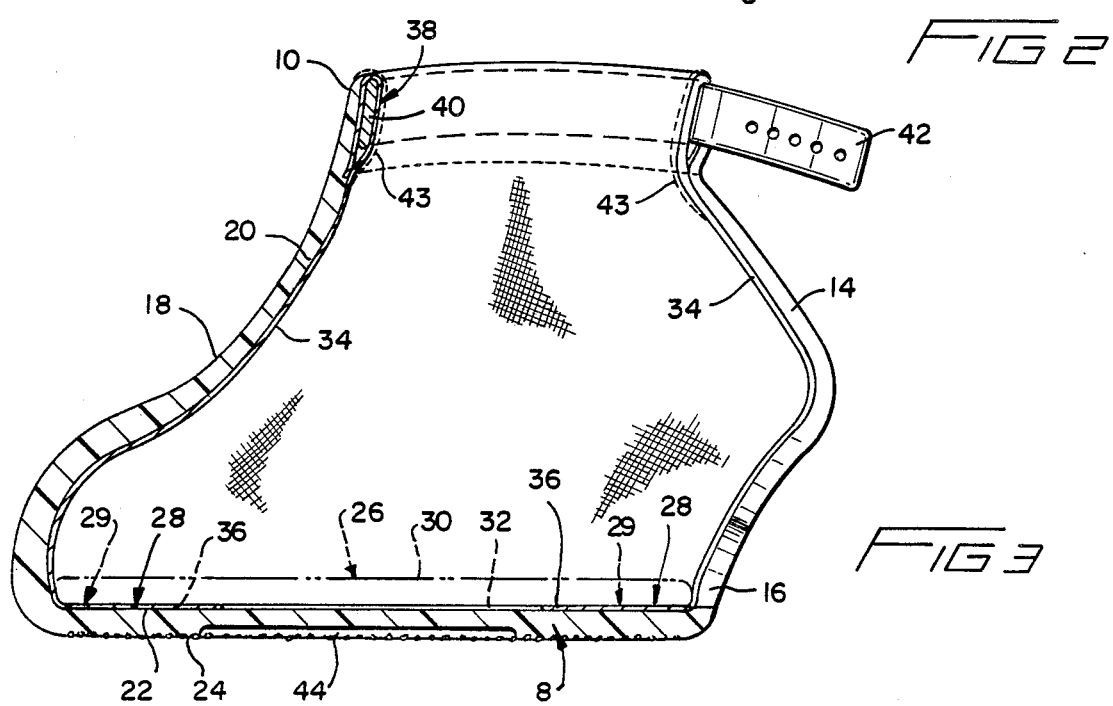

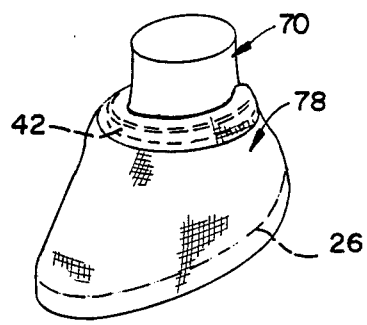
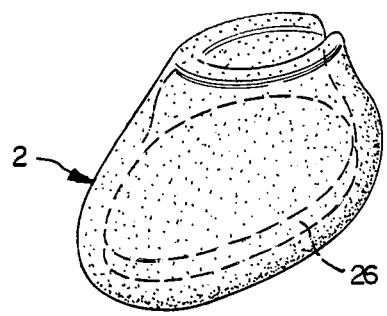
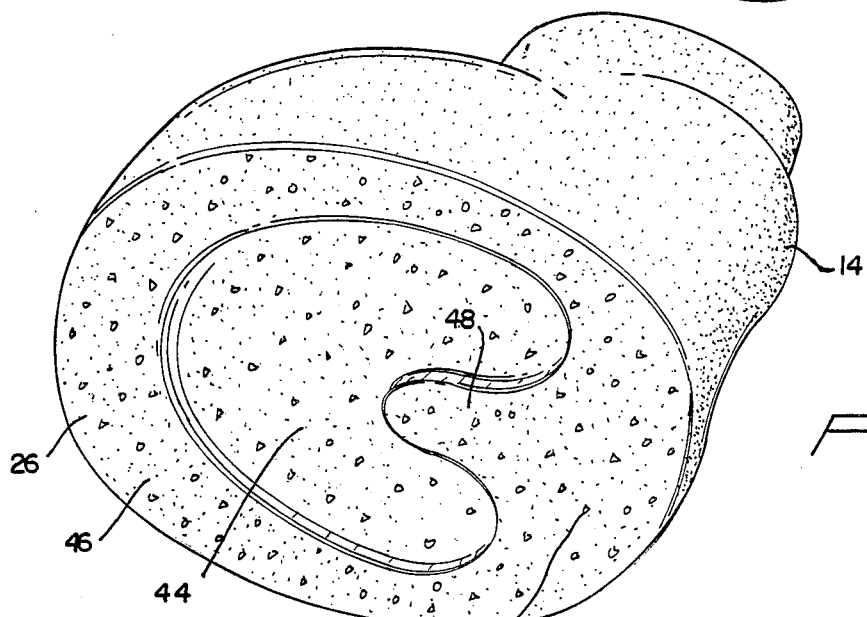
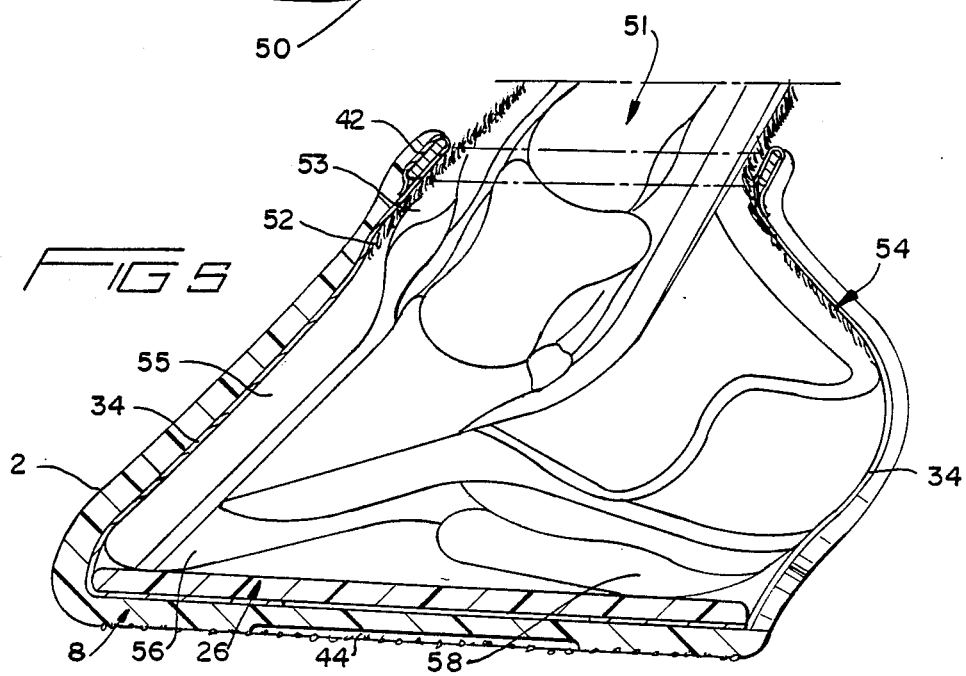

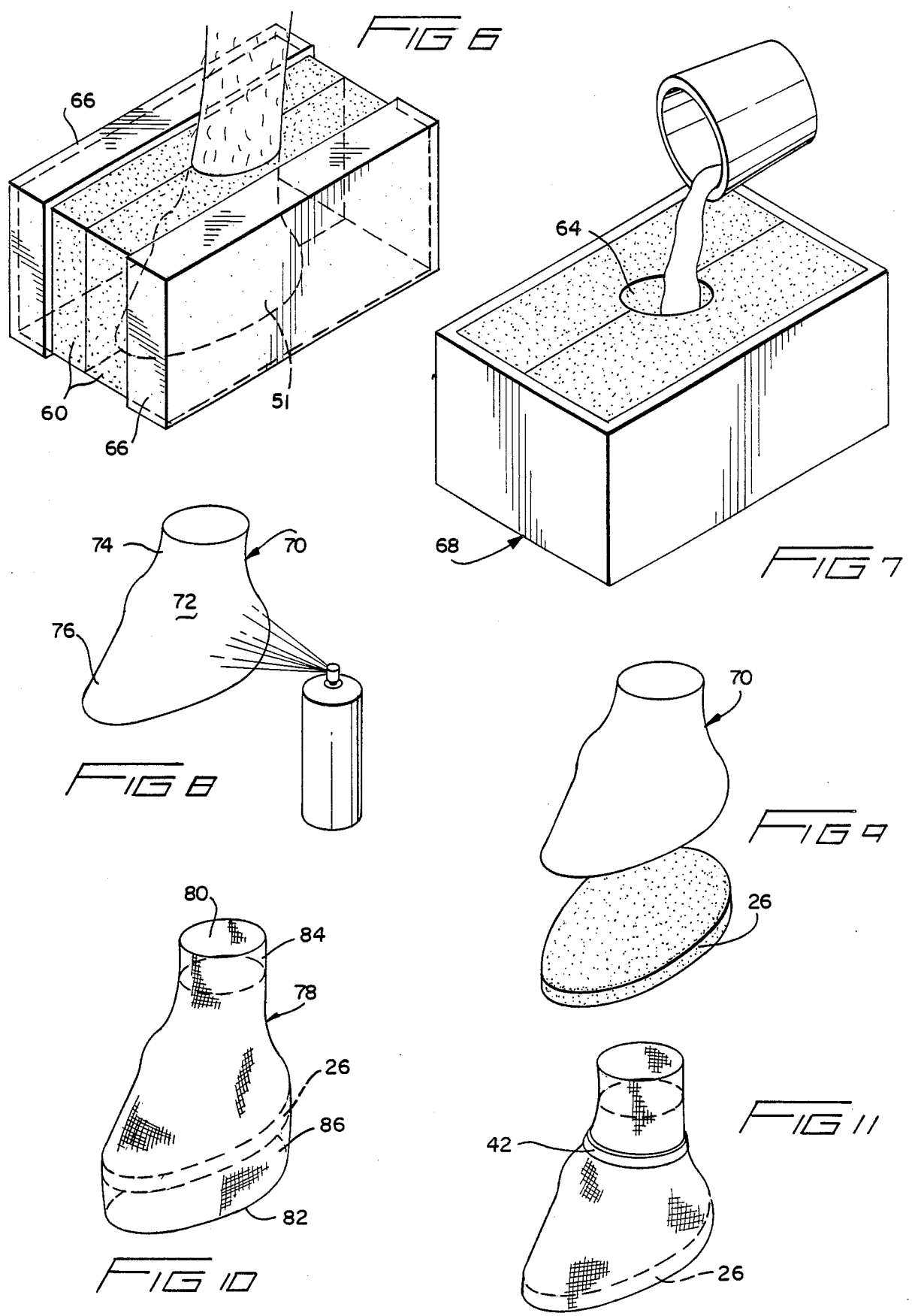

HORSE BOOT

FIELD OF THE INVENTION

The present invention relates generally to a horseshoe, and in particular to a molded flexible horse boot.

BACKGROUND OF THE INVENTION

The standard metal horseshoe which is popularly used today can cause several problems to a horse.

When an iron horseshoe is left on a horse for too long, the horseshoe prevents the hoof from expanding under the weight of the horse's weight as the hoof continues to grow downwardly. This causes contracted heels.

Hot forging of iron shoes by the farrier is a common practice to custom fit each iron shoe to the horse. This makes the shoeing process relatively expensive.

A pad is sometimes used in conjunction with an iron shoe. It is disposed between the iron shoe and the horse hoof. Its purpose is to help prevent bruising. However, when a pad is used, dirt, sand, small pebbles and other small hard particles can become lodged between the pad the horse hoof and work their way up inside the hoof wall to the coronet band over an extended period of use. This could cause lameness to the horse.

OBJECTS AND SUMMARY OF THE INVENTION

It is therefore an object of the present invention to provide a horse boot for replacing the traditional iron horseshoe.

It is another object of the present invention to provide a horse boot which can be secured to a horse hoof without the use of nails driven to the horse hoof wall as in the traditional iron horseshoeing.

It is still another object of the present invention to provide a horse boot which provides a relatively even weight distribution around the horse hoof.

It is yet another object of the present invention to provide a horse boot which covers the horse hoof to prevent the horse hoof from direct contact with the ground.

It is still further another object of the present invention to provide a horse boot which is relatively light weight compared to the traditional iron horseshoe.

It is an object of the present invention to provide a horse boot which is relatively easy to put on and take off for easy periodic inspection of the horse hoof.

It is another object of the present invention to provide a horse boot which is relatively lightweight, thereby reducing stress to the horse legs.

It is still another object of the present invention to provide a horse boot which is custom fit for each hoof of the horse, thereby permitting each boot to be made specifically according to the conditions of each hoof.

It is yet another object of the present invention to provide a horse boot which fits precisely onto the horse hoof, thereby minimizing relative motion between the boot and the hoof which can cause friction burn, blisters or tenderness to sensitive areas of the hoof.

It is still further another object of the present invention to provide a horse boot which provides ventilation to the hoof from the normal action of the hoof as it falls and rises.

It is another object of the present invention to provide a horse boot which protects the hoof from injury or to prevent an injury from becoming worse.

It yet another object of the present invention to provide a horse boot which promotes healthy hoof growth by stimulating the perioplic ring at the coronary region of the hoof, thereby stimulating the release of oils and increasing blood circulation necessary for hoof growth.

It is a further object of the present invention to provide a horse boot which is flexible, thereby expanding with the horse hoof and thus preventing contracted heels.

It is another object of the present invention to provide a horse boot which provides enough contact pressure between the hoof sole and the boot to improve the coronary vascular function of the hoof.

It is still another object of the present invention to provide a horse boot which provides improved traction relative to the traditional iron shoe.

It yet another object of the present invention to provide a horse boot which absorbs surface impact during use, thereby preventing possible injury to the horse legs.

It is yet a further object of the present invention to provide a horse boot which prevents drying of the hoof caused by the use of nails in the traditional iron horseshoeing process.

It is still another object of the present invention to provide a horse boot which retains moderate moisture which is essential for healthy hoof growth.

It is yet another object of the present invention to provide a horse boot which remains relatively dry from excess water during use.

It is an object of the present invention to provide a horse boot which remains flexible even at low temperature.

In summary, the present invention provides a horse boot which replaces the traditional iron shoe and thereby prevents all the attendant problems associated therewith and promote healthy hoofs.

These and other objects of the present invention will become apparent from the following detailed description.

BRIEF DESCRIPTIONS OF THE DRAWINGS

FIG. 1 is a front perspective view of a horse boot according to the present invention and a fragmentary perspective view of a horse foot, in phantom lines, fitted with the boot.

FIG. 2 is a rear perspective view of FIG. 1.

FIG. 3 is a cross-sectional view of the present invention taken from line 3—3 in FIG. 1, with portions shown in phantom lines.

FIG. 4 is a bottom perspective view of FIG. 1.

FIG. 5 is a cross-sectional fragmentary view of a horse hoof fitted with the horse boot of FIG. 3.

FIG. 6 is a perspective fragmentary view of a horse leg and hoof, and a perspective view of a molding setup used to make a mold of the hoof.

FIG. 7 is a perspective view of a mold made from FIG. 6 and from which a cast is made.

FIG. 8 is a perspective view of the cast of a horse hoof being coated with a release material.

FIG. 9 is a perspective view of the cast of FIG. 8 and a sole.

FIG. 10 is a perspective view of the cast and the sole of FIG. 9 within a sock material.

FIG. 11 is a perspective view of FIG. 10 showing a belt disposed adjacent a top portion of the cast and a bottom portion of the sock material folded unto a lower surface of the sole.

FIG. 12 is a perspective view of FIG. 11 showing a top portion of the sock material folded over the belt.

FIG. 13 is a perspective view of FIG. 12, without the cast, after an application of a layer of polyurethane material.

DETAILED DESCRIPTION OF THE INVENTION

FIGS. 1 through 4

A horse boot R is disclosed for completely enclosing a horse hoof. The boot R includes a one-piece, flexible enclosure 2. The enclosure 2 is preferably made from polyurethane material. The enclosure 2 includes a top opening 4, a wrap-around wall portion 6 and a bottom portion 8. The wrap-around wall portion 6 includes a rim 10 defining the top opening 4. A vertical slit 12 is disposed along the rear portion 14 of the enclosure 2. The vertical slit 12 intersects the upper rim 10 and is in communication with the top opening 4. The slit 12 proceeds downwardly from the upper rim 6 and terminates in a stress relief opening 16 adjacent the bottom portion 8. The slit 12 is adapted to open and close along its substantial length as the horse hoof expands and contracts under the weight of the horse and the rider. The stress relief opening 16 prevents tearing of the slit 12 at its terminal portion. The opening 16 also allows excess water within the boot R to drain out during use.

The enclosure 2 has outer and inner surfaces 18 and 20, respectively. The bottom portion 8 is integral with the wrap-around wall portion 6 and includes upper and lower surfaces 22 and 24, respectively. Preferably, the upper surface 22 is substantially even with the opening 16 to permit proper drainage of any water inside the boot R, thereby keeping the interior of the boot R relatively dry.

A sole 26 (shown in phantom lines) is disposed within the enclosure 2 and preferably secured thereto with the adhesives (not shown) or other conventional means known in the art. The sole 26 is substantially coextensive and is in engagement with the bottom portion 8 of the enclosure 2. The sole 26 is resilient and helps absorb the impact of the horse hoof when it strikes the ground. The material for the sole 26 is preferably rubber. Depending on the specific needs of a horse, the sole 26 can have more or less resiliency or weight. The sole 26 has a marginal portion 28, and upper and lower surfaces 30 and 32, respectively.

The sole 26 also provides a pumping action in cooperation with the horse hoof for squeezing any water picked up by the boot R during use. Water is squeezed out through the opening 16 and the slit 12 as the hoof applies pressure on the sole 26. In this manner, excess water does not stay within the boot R.

Although the sole 26 is disclosed, it is not necessary for all applications. For example, where a lightweight boot R is required, the sole 26 may be deleted. Also, where the hoof is healthy and the resilient nature of the sole 26 is not required to help in the proper functioning of the hoof, the sole 26 may be dispensed with. Furthermore, the sole 26 may not be needed where the ground is dry and the pumping action of the sole 26 is therefore not needed to drain any excess moisture from the boot R.

A layer of absorbent cloth material 34, which may be any natural or synthetic fibers, such as rayon, etc., surrounds the inner surface 20 of the enclosure 2 and is bonded thereto. The cloth material 34 includes a lower marginal portion 36 which is interposed between the upper surface 22 of the bottom portion 8 and the lower surface 32 of the sole 26 at their marginal portions 28 and 29, respectively. The lower marginal portion 36 is bonded to the marginal portion 28 of upper surface 22.

An upper marginal portion 38 of the cloth material 34 forms a pocket 40 for securing a belt 42 adjacent to the upper rim 10 of the wrap-around wall 6. The pocket 40 is in the form of a tube with the belt 42 positioned therethrough. The pocket 40 is bonded to the inside surface 20 of the wrap-around wall 6. The belt 42 includes a buckle 43 for securing the top opening 4 around the horse ankle. The belt 42 emerges from the pocket 40 adjacent to the slit 12.

The pocket 40 may be reinforced with a layer 43 (shown in phantom lines) of polyurethane material integral with the enclosure 2 and disposed o the inside portion of the enclosure 2 adjacent the opening 4 and bonded to the absorbent cloth material 34 to thereby encase the pocket 40 on both sides, as best shown in FIG. 3. The layer 43 may also comprise other resilient materials for providing a cushion to the horse hoof around the opening 4.

A depression 44 is disposed on an inside portion of the lower surface 24. The depression 44 is roughly in an outline of a horseshoe, as best shown in FIG. 4. A substantially annular ridge 46 is thereby formed on the lower surface 24 of the bottom portion 8 of the enclosure 2. The ridge 46 includes a tongue portion 48 which extends from rear to front of the boot R.

Chips of traction materials 50, such as silicon carbide, is preferably imbedded in the lower surface 24 of the bottom portion 8 to provided added traction and durability to the boot R.

OPERATION

FIG. 5

The boot R is installed onto the horse hoof 51 from the front. The belt 42 is freed from its buckle 43. The top opening 4 is enlarged by means of the slit 12. Since the boot R is made of flexible material, the act of enlarging the top opening 4 is relatively easily done. The boot R is then slipped into the horse hoof and the belt 42 is secured to its buckle to prevent the boot R from slipping off.

Since the boot R is precisely made to the dimensions of the horse hoof, as will be described below, a snug fit is attained so that the boot R will not easily slip off the hoof. Thus, the belt 42 need not be tightened as to apply pressure to the horse leg which can cut off blood circulation. Instead, only enough pressure is needed to prevent the top opening 4 from enlarging. The belt 42 also secures the slit 12 at its upper end where it opens up into the top opening 4. In this manner, the slit 12 is free to open and close along its substantial length in reaction to the expansion and contraction of the hoof 51 during a riding activity. The opening and closing of the slit 12 helps to ventilate the interior of the enclosure 2, thereby removing any excess moisture therefrom.

The boot R is fitted to the horse hoof 51 such that the upper rim 10 is above the coronet band 52, thereby providing protection to the coronet band 52 from any damage, as best shown in FIG. 5. The coronet band 52 helps in the formation of the horny wall 55 of the hoof 51. If the coronet band 52 is damaged in any way, the growth of the wall 55 will be impaired, causing a cleft or a crack to develop thereon. The upper rim 10 is also disposed above the perioplic ring 53 to stimulate the perioplic ring 53 for the release of oils necessary for hoof protection. Finally, the upper rim 10 is disposed above the protruding cartilage or bull of hoof 54 to help secure the boot R to the hoof 51.

With the boot R properly fitted to the hoof, it can be seen that the boot R completely encloses the hoof, providing protection from injury or preventing an existing injury from getting worse.

During use, the boot R will pick up moisture from the ground through the top opening 4, the slit 12 or the opening 16. Any excess moisture will be carried away by the ventilating effect of the slit 12, or be squeezed and drained out through the slit 12 and the opening 16 by the action of the hoof 51 pressing on the sole 26, as discussed above.

The sole 26 also acts as a cushion for the horny sole 56 and the horny frog 58 of the hoof, while maintaining impact pressure on the horny frog 58. The horny frog 58 is very elastic and acts as a shock absorber and as a second heart to the horse. As the hoof is pressed against the ground, old blood is forced up and out of the foot. When the hoof is lifted off the ground, the elastic frog 58 springs back, letting new blood into the foot. Where the horny frog 58 is healthy and in good flexible shape, the sole 26 may be deleted. However, where the horny frog 58 is injured, the sole 26 helps the horny frog 58 perform its function.

PROCESS OF MAKING

FIGS. 6 through 13

Two blocks 60 of impression material are pressed around a horse hoof 51, insuring that each of the blocks 60 covers roughly one half of the hoof. The blocks 50 are preferably low compression closed cell foam made from phenolic resins. A mold 64 is thus created. Holder 66, preferably made of wood or acrylic, keeps the impression blocks 60 from breaking apart while being pressed onto the hoof 51 and aids in applying even pressure on the blocks 60 when making the mold 64.

The blocks 60 are next secured together inside a box 68. A prepared mixture of plaster and water is then poured into the mold 64 to make a cast 70. The cast 70 includes a wall portion 72, top portion 74 and bottom portion 76.

The cast 70 is sealed with at least two coats of polyurethane. After drying, the cast 70 is coated with silicone grease which acts as a release agent.

The sole 26 is next cut to the shape of the bottom portion 76 of the cast 70 and secured thereto. Again, the sole 26 may be omitted when it is not needed.

A flexible sock 78 made of natural or synthetic fibers or combination of both is pulled over the cast 70, thereby covering the entire wall portion 72 of the cast 70, as best shown in FIG. 10. The sock 78 has upper opening 80, a lower opening 82, an upper marginal portion 84 and lower marginal portion 86. The marginal portions 80 and 82 extend beyond the top portion 74 and the bottom portion 76, respectively of the cast 70.

The belt 42 is secured with the buckle 43 around the upper portion 74 of the cast 70 to overlie a portion of the sock 78. The marginal portion 84 of the sock 78 is then folded outwardly and downwardly to overlie the belt 42 and to form the pocket 40. The lower marginal portion 82 of the sock 78 is folded inwardly against the lower surface 32 of the sole 26. The sock 78 is now ready for the application of a polyurethane material, as best shown in FIG. 12.

The polyurethane material used for making the enclosure 2 of the boot R is preferably a two-component system which becomes a smooth trowelable paste in 1–2 minutes after mixing. A coloring material may be mixed into the polyurethane material if desired. The polyurethane material is applied on the sock 78 and on the lower surface 32 of the sole 26. The thickness of the applied polyurethane material is varied, depending on the area of the boot R. For example, the lower portions of the wrap-around wall 6 are thicker than the upper portions near the top opening 4. This provides for the needed flexibility around the top opening 4 when putting the boot R onto the horse hoof and provides for durability at the lower portions to prevent the hoof from piercing through the boot R. The polyurethane material possesses excellent low temperature flexibility, making the boot R ideal for year round outdoor use.

The lower surface 24 of the bottom portion 8 of the enclosure 2 is shaped into a substantially annular ridge 46 with a tongue portion 48 and a depression 44 while the material is still soft and has not yet completely cured. At the same time, traction material, such as silicon carbide chips 50, etc. are imbedded into the lower surface 24.

After the enclosure 2 has completely cured, the slit 12 is made. The cast 70 is then removed from the completed boot R. The coating of silicone grease previously applied to the cast 70 makes the separation relatively easy.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

We claim:

1. A horse boot for enclosing a horse hoof to at least above its coronet band, said boot comprising:
   (a) a flexible enclosure molded and adapted to fit around a horse hoof;
   (b) said enclosure having inner and outer surfaces, an upper opening, a bottom portion and a wrap-around wall portion integral with said bottom portion;
   (c) said bottom portion including upper and lower surfaces, said upper surface including a marginal portion;
   (d) said wrap-around wall portion including an upper rim and inner and outer surfaces;
   (e) said wrap-around wall portion including a vertical slit;
   (f) said slit intersecting said upper opening and terminating substantially adjacent said bottom portion, thereby permitting said upper opening to be enlarged for putting on or removing the boot from the horse hoof;
   (g) means operably associated with said wrap-around wall portion for securing the boot around the horse hoof;
   (h) said enclosure including a layer of cloth material bonded to said inner surface thereof; and
   (i) said cloth material including a lower edge folded inwardly and bonded to the marginal portion of said upper surface of said bottom portion.

2. A horse boot as in claim 1, wherein:
(a) said absorbent cloth material layer wraps around said inner surface of said wrap-around wall portion.

3. A horse boot as in claim 1, wherein:
(a) said cloth layer includes pocket means for being associated with said securing means.

4. A horse boot as in claim 3, wherein:
(a) said cloth material includes an upper edge folded upon itself and forming said pocket means and including said securing means.

5. A horse boot as in claim 4, wherein:
(a) said folded upper edge engages said inner surface of said wrap-around wall portion and is bonded thereto.

6. A horse boot as in claim 3, wherein:
(a) said pocket means is disposed adjacent said upper rim.

7. A horse boot as in claim 3, wherein:
(a) said securing means includes a belt and buckle assembly.

8. A horse boot as in claim 7, wherein:
(a) the ends of said belt and buckle assembly emerge from said pocket means adjacent said slit.

9. A horse boot as in claim 1, wherein:
(a) said wrap-around wall portion includes a front portion; and
(b) said front portion has a thickness which increases in the direction from said upper rim to said bottom portion.

10. A horse boot as in claim 1, wherein:
(a) said slit includes an opening disposed adjacent said enclosure bottom portion.

11. A horse boot as in claim 1, and further comprising:
(a) means for securing said slit at its upper end.

12. A horse boot as in claim 11, wherein:
(a) said boot securing means includes said slit securing means.

13. A horse boot as in claim 1, wherein:
(a) said lower surface of said bottom portion includes traction materials.

14. A horse boot as in claim 13, wherein:
(a) said traction materials includes chips of silicon carbide imbedded on said lower surface of said bottom portion.

15. A horse boot as in claim 1, wherein:
(a) said bottom portion bottom surface includes a central portion; and
(b) said central portion includes a depression.

16. A horse boot as in claim 15, wherein:
(a) said depression has an outline of a horse-shoe.

17. A horse boot as in claim 1, wherein:
(a) said bottom portion bottom surface includes a substantially annular ridge.

18. A horse boot as in claim 17, wherein:
(a) said annular ridge includes a tongue portion extending from the rear to the front.

19. A horse boot as in claim 1, wherein:
(a) said upper rim is disposed above the hoof coronet band when the boot is fitted on the horse hoof.

20. A horse boot as in claim 1, and further comprising:
(a) a resilient sole disposed within said enclosure and substantially coextensive with said entire bottom portion and in engagement with said upper surface of said bottom surface.

21. A horse boot for enclosing a horse hoof to at least above its coronet band, said boot comprising:
(a) a flexible enclosure molded and adapted to fit around a horse hoof;
(b) said enclosure having inner and outer surfaces, an upper opening, a bottom portion and a wrap-around wall portion integral with said bottom portion;
(c) said bottom portion including upper and lower surfaces;
(d) said wrap-around wall portion including an upper rim and inner and outer surfaces, said inner surface including an upper portion;
(e) said wrap-around wall portion including a vertical slit;
(f) said slit intersecting said upper opening and terminating substantially adjacent said bottom portion, thereby permitting said upper opening to be enlarged for putting on or removing the boot from the horse hoof;
(g) means operably associated with said wrap-around wall portion for securing the boot around the horse hoof;
(h) said enclosure including a layer of cloth material bonded to said inner surface thereof; and
(i) said cloth material including an upper edge folded upon itself and bonded to said upper portion of said inner surface of said wrap-around wall portion.

22. A horse boot as in claim 21, wherein:
(a) said cloth material layer wraps around said inner surface of said wrap-around wall portion.

23. A horse boot as in claim 22, wherein:
(a) said cloth layer includes pocket mean for being associated with said securing means.

24. A horse boot as in claim 23, wherein:
(a) said folded upper edge cloth material includes said pocket means and including said securing means.

25. A horse boot as in claim 24, wherein:
(a) said pocket means is disposed adjacent said upper rim.

26. A horse boot as in claim 23, wherein:
(a) said pocket means is disposed on said inner surface of said wrap-around wall portion and bonded thereto.

27. A horse boot as in claim 23, wherein:
(a) said securing means includes a belt and buckle assembly; and
(b) the ends of said belt and buckle assembly emerge from said pocket means adjacent said slit.

28. A method for molding a horse boot having a bottom surface with an inner portion, said method comprising the steps of:
(a) making a mold of a horse hoof;
(b) making a cast from said mold, said cast having bottom, top and wall portions;
(c) inserting said cast into a stretchable sock material until said cast wall portion is covered by said sock material and a substantial portion of said sock material extends above and below said cast;
(d) folding said upper extending portion of said sock material for forming a pocket;
(e) securing a belt to said upper extending portion which forms said pocket and positions said belt;
(f) folding said lower extending portion of said sock material inwardly to thereby overlie the bottom portion of said cast;

(g) subsequently, applying a layer of polyurethane material on said sock material and said bottom portion of said cast to a desired thickness; and
(h) allowing said polyurethane material to dry.

29. A method as in claim 28, and including the step of:
(a) applying a release material on said cast before inserting said cast into said sock material for preventing said sock material from sticking to said cast.

30. A method as in claim 28, wherein:
(a) said making said mold includes pressing two halves of impression material from two opposite directions onto the horse hoof.

31. A method as in claim 28, and including the step of:
(a) imbedding traction material into the bottom surface of the boot before said polyurethane material has cured.

32. A method as in claim 31, wherein:
(a) said imbedding said traction material includes silicon carbide chips.

33. A method as in claim 28, and including the step of:
(a) shaping the bottom surface of the boot to include a substantially annular ridge and a horseshoe-shaped depression in the inner portion of the bottom surface.

34. A method as in claim 28, and including the step of:
(a) providing a resilient sole at said bottom portion of said cast.

35. A method as in claim 28, wherein:
(a) positioning said belt so that the ends of said belt exit at the rear of said boot.

36. A method as in claim 35, and including the step of:
(a) slitting said boot between the ends of said belt.

* * * * *